No. 855,552.
PATENTED JUNE 4, 1907.
J. W. AYLSWORTH.
COMPOSITION FOR PHONOGRAPHIC RECORDS.
APPLICATION FILED MAY 31, 1906.
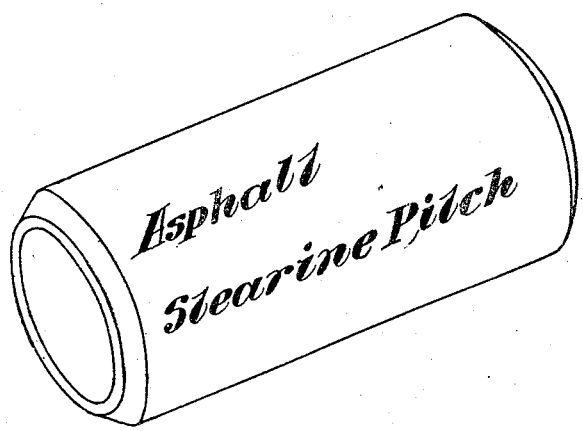

UNITED STATES PATENT OFFICE.

JONAS W. AYLSWORTH, OF EAST ORANGE, NEW JERSEY, ASSIGNOR TO NEW JERSEY PATENT COMPANY, OF WEST ORANGE, NEW JERSEY, A CORPORATION OF NEW JERSEY.

COMPOSITION FOR PHONOGRAPHIC RECORDS.

No. 855,552.   Specification of Letters Patent.   Patented June 4, 1907.

Application filed May 31, 1906. Serial No. 319,421.

*To all whom it may concern:*

Be it known that I, JONAS W. AYLSWORTH, a citizen of the United States, residing at 223 Midland avenue, East Orange, county of Essex, and State of New Jersey, have invented a new and useful Composition for Phonographic Records, of which the following is a description.

In an application for Letters Patent filed on even date herewith, I describe an improved duplicate phonograph record and process and apparatus for making the same, said record comprising a very smooth, hard, amorphous surface layer, and an inner layer welded thereto of much cheaper material, having the same coefficient of expansion so as to form a composite structure.

My present invention relates particularly to a suitable composition for the interior layer of composite phonographic records and my object is to provide a cheap tough and permanent material for this purpose.

To this end the invention consists of a composition of asphalt and stearin pitch, preferably in the proportion of about 80 parts by weight of asphalt and 20 parts by weight of the stearin pitch. Any hard asphalt, such as Syrian asphalt or gilsonite may be used, being preferably melted and strained, although the material may be used in the crude state. If desired, the asphalt may be made more fluid, so as to facilitate its casting within the surfacing layer by the addition of from five to fifteen percent of stearic acid. Stearin pitch, as is well-known, is a black tarry residue, obtained in the manufacture of stearic acid, and resembling ozocerite. The stearin pitch may be melted and added to the melted asphalt or the two ingredients may be added together in solid form in the desired porportions, and then melted and stirred until intimately associated.

Reference is hereby made to the accompanying drawing which shows a conventional record tablet with the names of the ingredients of my improved composition applied thereto.

Having now described my invention, what I claim as new and desire to secure by Letters Patent is as follows:—

1. A composition for phonographic records, consisting of asphalt and stearin pitch, substantially as set forth.

2. A composition for phonographic records, consisting of asphalt and a smaller proportion of stearin pitch, substantially as set forth.

3. A composition for phonographic records, consisting of asphalt, stearic acid and stearin pitch, substantially as set forth.

This specification signed and witnessed this 26th day of May 1906.

JONAS W. AYLSWORTH.

Witnesses:
FRANK L. DYER,
ANNA R. KLEHM.